United States Patent
Andersson et al.

(10) Patent No.: US 9,978,478 B2
(45) Date of Patent: *May 22, 2018

(54) POLYMER COMPOSITION FOR ELECTRICAL DEVICES

(75) Inventors: Johan Andersson, Hisings Backa (SE); Villgot Englund, Gothenburg (SE); Per-Ola Hagstrand, Stenungsund (SE); Ulf Nilsson, Stenungsund (SE); Annika Smedberg, Myggenas (SE); Thomas Steffl, Lauf (DE); Johannes Wolfschwenger, Niedermeukirchen (AT)

(73) Assignee: Borealis AG, Vienna (AT)

( * ) Notice: Subject to any disclaimer, the term of this patent is extended or adjusted under 35 U.S.C. 154(b) by 1140 days.
This patent is subject to a terminal disclaimer.

(21) Appl. No.: 14/115,108

(22) PCT Filed: May 3, 2012

(86) PCT No.: PCT/EP2012/058078
§ 371 (c)(1),
(2), (4) Date: Dec. 2, 2013

(87) PCT Pub. No.: WO2012/150285
PCT Pub. Date: Nov. 8, 2012

(65) Prior Publication Data
US 2014/0093732 A1    Apr. 3, 2014

(30) Foreign Application Priority Data

May 4, 2011  (SE) ..................................... 11164779

(51) Int. Cl.
*H01B 3/44*    (2006.01)
*C08L 23/08*   (2006.01)
(Continued)

(52) U.S. Cl.
CPC ............. *H01B 3/441* (2013.01); *C08K 3/013* (2018.01); *C08L 23/02* (2013.01); *C08L 23/06* (2013.01);
(Continued)

(58) Field of Classification Search
CPC ........... C08L 23/06; C08K 3/26; C08K 5/005; C08K 5/098
See application file for complete search history.

(56) References Cited

U.S. PATENT DOCUMENTS 4,626,618 A * 12/1986 Takaoka ................... C08K 3/04
                                                   174/102 SC
6,538,080 B1   3/2003 Swindoll et al.
(Continued)

FOREIGN PATENT DOCUMENTS

EP    0517868 B1   11/1995
EP    0688794 B1    8/1998
(Continued)

OTHER PUBLICATIONS

"Nanocomposites based on polyolefins and functional thermoplastic materials" Ciardelli, Polymer International, vol. 57, Issue 6, Mar. 12, 2008.*

*Primary Examiner* — Jennifer A Steele
(74) *Attorney, Agent, or Firm* — Eversheds Sutherland (US) LLP

(57) ABSTRACT

The present invention relates to a polymer composition, to the use of the composition for producing an electrical device, as well as to a cable surrounded by at least one layer including the polymer composition.

17 Claims, 1 Drawing Sheet

(51) Int. Cl.
*C08L 23/06* (2006.01)
*H03B 13/00* (2006.01)
*C08L 23/02* (2006.01)
*C08K 3/013* (2018.01)
*H01B 13/00* (2006.01)

(52) U.S. Cl.
CPC ...... *C08L 23/0815* (2013.01); *H01B 13/0013* (2013.01); *C08L 2203/202* (2013.01); *C08L 2207/062* (2013.01); *C08L 2207/066* (2013.01); *Y10T 428/2967* (2015.01)

(56) References Cited

U.S. PATENT DOCUMENTS

| | | |
|---|---|---|
| 2002/0034689 A1 | 3/2002 | Hoshida et al. |
| 2002/0042451 A1 | 4/2002 | Sugaya |
| 2004/0138351 A1 | 7/2004 | Kaprinidis et al. |
| 2004/0210002 A1 | 10/2004 | Haekoenen et al. |
| 2006/0055075 A1 | 3/2006 | Hoshida et al. |
| 2006/0142458 A1* | 6/2006 | Pang ............... B82Y 30/00 524/444 |
| 2006/0151758 A1 | 7/2006 | Reyes |
| 2007/0299173 A1 | 12/2007 | Wolfschwenger et al. |
| 2008/0254289 A1* | 10/2008 | Bostrom ............ C08K 5/01 428/375 |
| 2008/0315159 A1 | 12/2008 | Minagoshi |
| 2009/0238957 A1* | 9/2009 | Clancy ............ C08L 23/02 427/117 |
| 2010/0086268 A1 | 4/2010 | Reyes |
| 2011/0042624 A1 | 2/2011 | Minagoshi |
| 2011/0196078 A1 | 8/2011 | Wolfschwenger et al. |

FOREIGN PATENT DOCUMENTS

| | | | |
|---|---|---|---|
| EP | 1033724 A1 * | 9/2000 | ........... H01B 7/2825 |
| EP | 1168469 A2 | 1/2002 | |
| EP | 11211289 A1 | 6/2002 | |
| EP | 0810235 B1 | 11/2004 | |
| EP | 1484345 A1 | 12/2004 | |
| EP | 1669403 A1 | 6/2006 | |
| JP | 2018811 | 1/1990 | |
| JP | 04-322009 | 11/1992 | |
| JP | 05-301996 | 11/1993 | |
| JP | 06052728 A * | 2/1994 | |
| JP | 09-129039 | 5/1997 | |
| JP | 2001-266650 | 9/2001 | |
| JP | 2001266650 * | 9/2001 | ............... H01B 3/44 |
| JP | 2001-266650 A | 3/2003 | |
| JP | 2009-249390 | 10/2009 | |
| WO | 93/08222 A1 | 4/1993 | |
| WO | 0041187 | 7/2000 | |
| WO | 2001/037289 A1 | 5/2001 | |
| WO | 2003/000754 A1 | 1/2003 | |
| WO | 2004/041919 A2 | 5/2004 | |
| WO | 2009100982 | 8/2009 | |
| WO | 2010003649 | 1/2010 | |
| WO | WO 2011023440 A1 * | 3/2011 | ............... C08L 23/04 |

\* cited by examiner

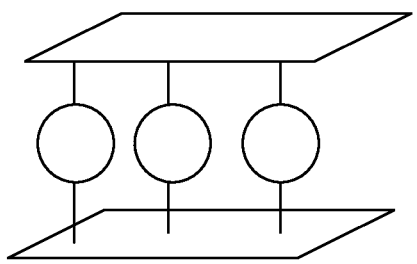

POLYMER COMPOSITION FOR ELECTRICAL DEVICES

FIELD OF INVENTION

The invention relates to a polymer composition for producing an electrical or communication device, preferably a layer of a cable, preferably of a power cable, more preferably of a direct current (DC) power cable, to a cable, preferably a power cable, more preferably a direct current (DC) power cable, which comprises the polymer composition and is optionally crosslinkable and subsequently crosslinked, as well as to a preparation process of the cable.

BACKGROUND ART

Polyolefins are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the electrical properties of importance may differ in different cable applications, as is the case e.g. between alternating current (AC) and direct current (DC) cable applications.

A typical power cable comprises a conductor surrounded, at least, by an inner semiconductive layer, an insulation layer and an outer semiconductive layer, in that order. The cables are commonly produced by extruding the layers on a conductor.

Crosslinking of Cables

The polymer material in one or more of said layers is often crosslinked to improve e.g. heat and deformation resistance, creep properties, mechanical strength, chemical resistance and abrasion resistance of the polymer in the layer(s) of the cable. In crosslinking reaction of a polymer interpolymer crosslinks (bridges) are primarily formed. Crosslinking can be effected using e.g. a free radical generating compound. Free radical generating agent is typically incorporated to the layer material prior to the extrusion of the layer(s) on a conductor. After formation of the layered cable, the cable is then subjected to a crosslinking step to initiate the radical formation and thereby crosslinking reaction. Peroxides are very commonly used as free radical generating compounds. The resulting decomposition products of peroxides may include volatile by-products which are often undesired, since e.g. may have a negative influence on the electrical properties of the cable. Therefore the volatile decomposition products such as methane are conventionally reduced to a minimum or removed after crosslinking and cooling step. Such removal step, generally known as a degassing step, is time and energy consuming causing extra costs.

Electrical Conductivity

The DC electrical conductivity is an important material property e.g. for insulating materials for high voltage direct current (HV DC) cables. First of all, the strong temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HV DC cables, the insulation is heated by the leakage current. For a specific cable design the heating is proportional to the insulation conductivity×(electrical field)$^2$. Thus, if the voltage is increased, far more heat will be generated.

JP2018811A discloses an insulation layer for a DC cable which contains a blend of 2-20 wt % of a high density polyethylene with a low density polyethylene. It is stated that blend provides improved DC breakdown and an impulse property. The blend is mixed with 2-3 wt % of a crosslinking agent. The type and layer structure of the cable has not been specified.

There are high demands to increase the voltage of a power cable, preferably of direct current DC power cable, and thus a continuous need to find alternative polymer compositions with reduced conductivity. Such polymer compositions should preferably also have good mechanical properties required for demanding power cable embodiments.

FIGURES

FIG. 1 is a schematic partial section of two lamellas and an interlayer in between to illustrate generally the lamellar structure of a preferable anion exchanger additive as the ion exchanger additive (b). The stable lamella layers are shown as continuous layers and the round shaped species illustrate the exchangeable anions of interlayers.

DESCRIPTION OF THE INVENTION

The present invention provides a polymer composition which is highly suitable polymer material for a layer, preferably an insulation layer of a cable, preferably of a power cable, more preferably of a direct current (DC) power cable, and which comprises (a) a polyolefin which is other than low density polyethylene (LDPE),
(b) a second polyolefin which is different from the polyolefin (a), and
(c) an ion exchanger additive.

The polymer composition of the invention is referred herein below also shortly as "polymer composition" or "Polymer composition". The components thereof as defined above are also shortly referred herein as "polyolefin (a)", "second polyolefin (b)" and, respectively, "ion exchanger additive (c)".

"Low density polyethylene", LDPE, is a polyethylene produced in a high pressure (HP) polymerization process. Typically the polymerization of ethylene and optional further comonomer(s) in the high pressure process is carried out in the presence of an initiator(s). The meaning of LDPE polymer is well known and documented in the literature. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as different branching architecture, compared to the PE produced in the presence of an olefin polymerisation catalyst. "Polyolefin produced in the presence of an olefin polymerisation catalyst", in turn, is also often called as "low pressure polyolefin" to distinguish it clearly from LDPE. Both expressions are well known in the polyolefin field.

Unexpectedly, when a polyolefin (a) other than LDPE is blended to a second polyolefin (b) the resulting polymer composition exhibits improved electrical properties. Moreover, when the said blend is further blended together with an ion exchanger additive (c) the resulting polymer composition exhibits even more improved electrical properties compared to the electrical properties of a reference polymer comprising one polymer component only or the same polymer blend, but without the ion exchanger additive (c) or with conventional small molecule acid scavengers which are typically used with polyolefins produced in the presence of an olefin polymerisation catalyst. Namely, the polymer composition of the invention has surprisingly reduced, i.e. low, electrical DC conductivity. "Reduced" or "low" electrical conductivity as used herein interchangeably means that the value obtained from the DC conductivity measurement as defined below under "Determination methods" is low, i.e. reduced.

Without binding to any theory it is believed that the ion exchanger additive (c) captures the ionic species which worsen (increase) the electrical DC conductivity, for instance the harmful anionic species, such as chlorine, which can be present in the polymer (a).

Accordingly, the polymer composition is very desirable for electrical and communication applications, preferably for wire and cable applications, particularly for a power cable layers. Moreover, the low electrical DC conductivity is beneficial for minimising the undesired heat formation, e.g. in an insulation layer of a cable, preferably of a power cable, more preferably of a DC power cable.

Moreover, for instance, polyolefins produced in the presence of an olefin polymerization catalyst typically contain catalyst residues, such as anionic species, typically halogens, often chlorine. Therefore acid scavengers have been added to the produced polyolefin to protect e.g. the processing equipment against corrosion caused by the undesirable residues, such as hydrochloric acid formed from chlorine based residues. In the prior art the conventionally used acid scavengers have been found to increase the electrical DC conductivity of the polymer which is highly undesirable for the power cable layer material and limits the use of the polyolefins produced by an olefin polymerization catalyst in the power cables operating in MV and particularly in HV levels, more particularly in the HV and EHV direct current (DC) cable applications. The ion exchanger additive (c) of the polymer composition of the invention captures the undesirable ionic catalyst residues effectively and lowers markedly the electrical DC conductivity of a polyolefin produced by an olefin polymerization catalyst. As a result, the use of conventional acid scavengers with undesirable effect on electrical DC conductivity can be avoided.

The invention is thus very advantageous for polymer compositions comprising blends of any of LDPEs or a polyolefins produced by an olefin catalyst, or for both.

Accordingly the polymer composition is very desirable particularly for power cable applications. A power cable is defined to be a cable transferring energy operating at any voltage level. Moreover, the polymer composition is very advantageous layer material for a DC power cable, which can be e.g. a low voltage (LV), a medium voltage (MV), a high voltage (HV) or an extra high voltage (EHV) DC cable, which terms, as well known, indicate the level of operating voltage. The polymer composition is even more preferable layer material for a HV power cable operating at any voltages, preferably for a HV DC power cable operating at voltages higher than 36 kV. For HV DC cables the operating voltage is defined herein as the electric voltage between ground and the conductor of the high voltage cable. The preferred cable is a HV DC power cable.

Accordingly, the present invention is further directed to a use of a polymer composition, comprising
(a) a polyolefin which is other than low density polyethylene (LDPE),
(b) a second polyolefin which is different from the polyolefin (a), and
(c) an ion exchanger additive; as defined above, below or in claims; for producing an electrical or communication device comprising said polymer composition, preferably for producing an insulation of an electrical or communication device. Such devices are e.g. cables, joints including termination joints in cable applications, capacitor films etc. The most preferred use of the invention is the use of said polymer composition for producing a layer of a cable.

More preferably, the invention is directed a to a use of a polymer composition for producing at least one layer, preferably at least an insulation layer, of a cable, more preferably of a power cable, more preferably of a direct current (DC) power cable, comprising a conductor surrounded by at least an inner semiconductive layer, an insulation layer and an outer semiconductive layer, in that order, wherein the polymer composition comprises
(a) a polyolefin which is other than low density polyethylene (LDPE),
(b) a second polyolefin which is different from the polyolefin (a), and
(c) an ion exchanger additive; as defined above, below or in claims.

The invention also provides a cable, preferably a power cable, preferably a direct current (DC) power cable, comprising a conductor which is surrounded by at least one layer, preferably at least by an insulation layer, more preferably a direct current (DC) power cable, comprising a conductor which is surrounded at least by an inner semiconductive layer, an insulation layer and an outer semiconductive layer, in that order, wherein said at least one layer, preferably at least the insulation layer, comprises a polymer composition comprising
(a) a polyolefin which is other than low density polyethylene (LDPE),
(b) a second polyolefin which is different from the polyolefin (a), and
(c) an ion exchanger additive; as defined above, below or in claims.

Preferably the polymer composition is used in a layer of a HV power cable operating at voltages of 40 kV or higher, even at voltages of 50 kV or higher. More preferably, the polymer composition is used in a layer of a HV power cable operating at voltages of 60 kV or higher. The invention is also highly feasible in very demanding cable applications and can be used in a layer of a HV power cable operating at voltages higher than 70 kV. The upper limit is not limited. The practical upper limit can be up to 900 kV. The invention is advantageous for use in HV power cable applications operating from 75 to 400 kV, preferably 75 to 350 kV. The invention is also found to be advantageous even in demanding extra HV power cable applications operating 400 to 850 kV. The preferred HV or extra HV power cable at any of the above voltage ranges is a HV DC power cable or an extra HV DC power cable.

HV DC power cable as used below or in claims means herein either HV DC power cable, preferably with operating at voltages as defined above, or extra high HV DC power cable, preferably with operating at voltages as defined above. Thus the term covers independently the operating areas for both the HV DC cable also EHV DC cable applications.

The polymer composition has preferably an electrical conductivity of 100 fS/m or less, preferably 90 fS/m or less, more preferably of <0.01 (lower values not detectable by the DC conductivity measurement) to 80 fS/m, more preferably of <0.01 to 70 fS/m, more preferably of <0.01 to 60 fS/m, more preferably of <0.01 to 10 fS/m, more preferably of <0.01 to 8.00 fS/m, more preferably of <0.01 to 6.00 fS/m, more preferably of <0.01 to 5.00 fS/m, more preferably of <0.01 to 4.00 fS/m, most preferably of 0.01 to 3.5 fS/m, most preferably of 0.02 to 3.0 fS/m, when measured according to DC conductivity method as described under "Determination Methods".

Accordingly, the invention is also directed to a method for reducing, i.e. for providing a low, electrical conductivity of a polymer composition of a power cable, preferably of a DC power cable, by producing at least one layer, preferably an insulation layer, using the polymer composition comprising
(a) a polyolefin which is other than low density polyethylene (LDPE),
(b) a second polyolefin which is different from the polyolefin (a), and
(c) an ion exchanger additive; as defined above, below or in claims.

Preferably, the polymer composition comprises the polyolefin (a) in an amount of 0.1 to 99.9 wt %, preferably of 0.5 wt % or more, preferably of 0.5 to 80 wt %, more preferably of 1.0 to 70 wt %, more preferably of 1.0 to 50 wt %, more preferably of 1.0 to 40 wt %, more preferably of 1.0 to 30 wt %, more preferably of 1.0 to 25 wt %, even more preferably 1.0 to 20 wt %, even more preferable 1.0 to 17 wt %, based on the combined weight of the polyolefin (a) and the second polyolefin (b).

The polyolefin (a) is preferably a polyethylene produced in the presence of an olefin polymerisation catalyst and selected from an ethylene homopolymer or a copolymer of ethylene with one or more comonomer(s); or a homo- or copolymer of C3-20 alpha-olefin produced in the presence of an olefin polymerisation catalyst which is preferably selected from a propylene homopolymer, a random copolymer of propylene with one or more comonomer(s) or heterophasic copolymer of propylene with one or more comonomer(s), or from homo- or copolymers of butene.

According to one preferable embodiment, the polyolefin (a) is a polyethylene produced in the presence of an olefin polymerisation catalyst selected from very low density polyethylene (VLDPE) copolymers, linear low density polyethylene (LLDPE) copolymers, medium density polyethylene (MDPE) copolymers or high density polyethylene (HDPE) homopolymers or copolymers. The low pressure polyethylene can be unimodal or multimodal with respect to molecular weight distribution.

The most preferred polyolefin (a) is a polyethylene produced in the presence of an olefin polymerisation catalyst and selected from an ethylene homopolymer or a copolymer of ethylene with one or more comonomer(s) as defined above or below. Even more preferably the polyolefin (a) is a MDPE polymer or a HDPE polymer, most preferably a HDPE polymer as defined above or below, even more preferably a HDPE polymer which is unimodal or multimodal with respect to molecular weight distribution as defined above or below.

Further preferably, the polymer composition comprises the polyolefin (b) in an amount of 0.1 to 99.9 wt %, preferably of 99.5 wt % or less, preferably of 20 to 99.5 wt %, more preferably of 30 to 99.0 wt %, more preferably of 50 to 99.0 wt %, more preferably of 60 to 99.0 wt %, more preferably of 70 to 99.0 wt %, more preferably of 75 to 99.0 wt %, even more preferably of 80 to 99.0 wt %, even more preferably of 83 to 99.0 wt %, based on the combined weight of the polyolefin (a) and the second polyolefin (b).

Preferably, the second polyolefin (b) is a polyolefin as defined for polyolefin (a) above or later below and is different from polyolefin (a), or is a low density polyethylene (LDPE) polymer selected from an optionally unsaturated LDPE homopolymer or an optionally unsaturated LDPE copolymer of ethylene with one or more comonomer(s). In the most preferred embodiment of the invention the polyolefin (b), the polyolefin (b) is an LDPE selected from an optionally unsaturated LDPE homopolymer or an optionally unsaturated LDPE copolymer of ethylene with one or more comonomer(s).

The polyolefin (a) and the second polyolefin (b) and the further properties and preferable embodiments thereof are further described later below.

As to the ion exchanger additive (c) of the polymer composition:

The ion exchanger additive (c) of the polymer composition of the invention can be added to the polymer composition as such, i.e. neat, or as an additive composition as supplied by additive producers, which may contain e.g. a carrier material, e.g. a carrier polymer, and optionally further additives. Moreover, such ion exchanger additive (c) or the additive composition thereof can be added to the polymer composition as such, e.g. as supplied by the additive producer, or in a further carrier material, e.g. in a polymer carrier, for instance in a so called master batch (MB). The amount of the ion exchanger additive (c) as given below and claims is the weight (amount) of said ion exchanger additive (c) as such, i.e. neat, based on the total weight (amount) (100 wt %) of the polymer composition.

The ion exchanger additive (c) of the polymer composition of the invention is preferably an inorganic ion exchanger additive, more preferably an inorganic anion exchanger additive. Furthermore preferably the anion exchanger additive (c) can exchange anions by halogens (i.e. capture halogens), preferably at least chlorine based species. Further preferably the ion exchanger additive (c) has a lamellar structure.

The preferred embodiment of the ion exchanger additive (c) is a lamellar anion exchanger, preferably a lamellar anion exchanger which comprises anionic interlayers. The preferable lamellar ion exchanger additive (c) comprises lamella layers which form the stable host lattice and the exchangeable anionic interlayers are between said lamellas. Anionic interlayers mean herein that the interlayers comprise anions which are weakly bonded to the lamella layers and exchangeable with the anionic species present in the polymer (a) of the polymer composition. FIG. 1 illustrates generally the lamellar structure (a schematic partial section showing two lamellas and an interlayer in between) of an anion exchanger additive as the preferable ion exchanger additive (c). In this preferred embodiment the interlayers of the lamellar anion exchanger (c) preferably comprise $CO_3^{2-}$ anions that are exchangeable with the anionic species present in the polymer composition, such as in any or both of the polyolefin components (a) and (b) of the polymer composition. Moreover, in this preferred embodiment the stable lamellas comprise preferably cation species selected e.g. from any of Mg-, Al-, Fe-, Cr-, Cu-, Ni- or Mn-cations, or any mixtures thereof, more preferably at least from $Mg^{2+}$-cations, and more preferably from $Mg^{2+}$ and $Al^{3+}$-cations, based species.

In this preferred embodiment the most preferred ion exchanger additive (c) is a lamellar anion exchanger additive of hydrotalcite type, preferably a lamellar anion exchanger additive of a synthetic hydrotalcite type comprising anionic interlayers which comprise exchangeable $CO_3^{2-}$ anions, even more preferably a lamellar anion exchanger additive of synthetic hydrotalcite type having a general formula $Mg_x R_y^{(3+)}(OH)_z(CO_3)_k * nH_2O$, wherein $R^{(3+)}$=Al, Cr or Fe, preferably Al. In said general formula, preferably, x is between 4-6; y is 2; z is between 6-18, k is 1 and n is between 3-4. It is evident that the ratios can vary, depending e.g. of the amount of the crystal water etc. As a non-limiting example only a general formula $Mg_6R_2^{(3+)}(OH)_{16}CO_3 * 4H_2O$, wherein $R^{(3+)}$=Al, Cr or Fe, preferably Al, can be mentioned.

Moreover in this preferred embodiment the ion exchanger additive (c), preferably the hydrotalcite as specified above, below or in claims, can be modified, for instance surface treated, as well known in the art.

The ion exchanger additives (c) suitable for the present invention are e.g. commercially available. Amongst the preferred ion exchanger additives (c), a commercially available synthetic hydrotalcite (IUPAC name: dialuminium hexamagnesium carbonate hexadecahydroxide, CAS no. 11097-59-9), can be mentioned, such as supplied by Kisuma Chemicals under the commercial name DHT-4V.

The amount of the ion exchanger additive (c), preferably the hydrotalcite as defined above, below or in claims, naturally depends on the desired end application (e.g. the desired conductivity level) and the amounts of the polymer components (a) and (b) and can be adapted by a skilled person. Preferably, the polymer composition comprises the ion exchanger additive (c), preferably the hydrotalcite, as defined above, below or in claims, as such, i.e. neat, in an amount of less than 1 wt %, preferably less than 0.8 wt %, preferably from 0.000001 to 0.7 wt %, preferably from 0.000005 to 0.6 wt %, more preferably from 0.000005 to 0.5 wt %, more preferably from 0.00001 to 0.1 wt %, more preferably from 0.00001 to 0.08 w %, more preferably from 0.00005 to 0.07 w %, more preferably from 0.0001 to 0.065 w %, more preferably from 0.0001 to 0.06 w %, more preferably from 0.0001 to 0.05 w %, based on the total weight of the polymer composition.

Additionally, in case where the polymer composition comprises polyolefin (a) in amounts of less than 50 wt %, based on the combined weight of the polyolefin (a) and the second polyolefin (b), then the ion exchanger additive (c), preferably the hydrotalcite as defined above, below or in claims, is in amount of from 0.0001 to 0.06 w %, more preferably from 0.0001 to 0.05 w %, more preferably from 0.0001 to 0.045 wt %, more preferably from 0.00015 to 0.035 wt %, more preferably from 0.0002 to 0.025 wt %, more preferably from 0.0003 to 0.015 wt %, more preferably from 0.0005 to 0.01 wt %, more preferably from 0.0008 to 0.005 wt %, more preferably from 0.001 to 0.004 wt %, more preferably from 0.0015 to 0.0035 wt %, based on the total weight of the polymer composition.

In a very preferred embodiment, the polymer composition comprises the polyolefin (a) in an amount of 1.0 to 50 wt %, preferably of 1.0 to 40 wt %, more preferably of 1.0 to 30 wt %, even more preferably of 1.0 to 25 wt %, even more preferably 1.0 to 20 wt %, even more preferable 1.0 to 17 wt %, based on the combined weight of the polyolefin (a) and the second polyolefin (b) and the polymer composition comprises the polyolefin (b) in an amount of 50 to 99.0 wt %, preferably of 60 to 99.0 wt %, more preferably of 70 to 99.0 wt %, more preferably of 75 to 99.0 wt %, even more preferably of 80 to 99.0 wt %, even more preferably of 83 to 99.0 wt %, based on the combined weight of the polyolefin (a) and the second polyolefin (b), and, additionally, the ion exchanger additive (c), preferably the hydrotalcite as defined above, below or in claims, in amount of from 0.0001 to 0.06 w %, more preferably from 0.0001 to 0.05 w %, more preferably from 0.0001 to 0.045 wt %, more preferably from 0.00015 to 0.035 wt %, more preferably from 0.0002 to 0.025 wt %, more preferably from 0.0003 to 0.015 wt %, more preferably from 0.0005 to 0.01 wt %, more preferably from 0.0008 to 0.005 wt %, more preferably from 0.001 to 0.004 wt %, more preferably from 0.0015 to 0.0035 wt %, based on the total weight of the polymer composition.

The polymer composition of the invention can be crosslinked or non-crosslinked. Surprisingly, the polymer composition has the beneficial low electrical DC conductivity also when it is crosslinked. Accordingly, the polymer composition of the invention is preferably crosslinkable. The crosslinking contributes preferably also to the mechanical properties and the heat and deformation resistance of the polymer composition.

"Crosslinkable" means that the polymer composition can be crosslinked using a crosslinking agent(s) before the use in the end application thereof. Crosslinkable polymer composition of the invention further comprises a crosslinking agent. It is preferred that the polymer composition comprising the polyolefin (a), the second polyolefin (b) and the ion exchanger additive (c) of the polymer composition is crosslinked. Moreover, the crosslinked polymer composition or, respectively, one or both crosslinked polymer components of the polyolefin (a) and the second polyolefin (b) is/are most preferably crosslinked via radical reaction with a free radical generating agent. The crosslinked polymer composition has a typical network, i.a. interpolymer crosslinks (bridges), as well known in the field. As evident for a skilled person, the crosslinked polymer composition can be and is defined herein with features that are present in the polymer composition, polyolefin (a) or the second polyolefin (b) before or after the crosslinking, as stated or evident from the context. For instance the amount of the crosslinking agent in the polymer composition or a compositional property, such as MFR, density and/or unsaturation degree, of the polyolefin (a) or the second polyolefin (b) are defined, unless otherwise stated, before crosslinking. "Crosslinked" means that the crosslinking step provides a further technical feature to the crosslinked polymer composition (product by process) which makes a further difference over prior art.

In embodiments, wherein the polymer composition comprises no crosslinking agent, the electrical DC conductivity as described under the "Determination method" is measured from a sample of said polymer composition which is non-crosslinked (i.e. does not contain a crosslinking agent and has not been crosslinked with a crosslinking agent). In embodiments, wherein the polymer composition is crosslinkable and comprises a crosslinking agent, then the electrical DC conductivity is measured from a sample of the crosslinked polymer composition (i.e. a sample of the polymer composition is first crosslinked during the sample preparation using the crosslinking agent initially present is the polymer composition and then the electrical conductivity is measured from the obtained crosslinked sample). The DC conductivity measurement from a non-crosslinked or a crosslinked polymer composition sample is described under "Determination Methods". The amount of the crosslinking agent, if present, can vary, preferably within the ranges given below.

The expression "no crosslinking agent" means herein above and below that the polymer composition does not comprise any crosslinking agent which had been added to the polymer composition for the purpose of crosslinking the polymer composition.

In the preferred embodiment of the invention the polymer composition comprises
(a) a polyolefin which is other than low density polyethylene (LDPE),
(b) a second polyolefin which is different from the polyolefin (a),
(c) an ion exchanger additive, and
a crosslinking agent; as defined above, below or in claims.

Further preferably, the polymer composition comprises crosslinking agent which is most preferably a peroxide. The polymer composition preferably comprises peroxide in an amount of up to 110 mmol —O—O—/kg polymer composition, preferably of up to 90 mmol —O—O—/kg polymer composition, more preferably of 0 to 75 mmol —O—O—/kg polymer composition, preferably of less than 50 mmol —O—O—/kg polymer composition, preferably of less than 40 mmol —O—O—/kg polymer composition.

In a preferred embodiment the polymer composition comprises peroxide in an amount of less than 37 mmol —O—O—/kg polymer composition, preferably of less than 35 mmol —O—O—/kg polymer composition, preferably of 0.1 to 34 mmol —O—O—/kg polymer composition, preferably of 0.5 to 33 mmol —O—O—/kg polymer composition, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95 wt % of the well known dicumyl peroxide based on the total amount (100 wt %) of the polymer composition.

With low peroxide content advantageously low electrical DC conductivity can be achieved and the prior art drawbacks relating to the use of a crosslinking agent in a cable layer can be minimised. Moreover, the used lower peroxide content can shorten the required degassing step of the produced and crosslinked cable, if desired. This is unexpected and not predictable from the state of the art.

Such polymer composition may comprise one type of peroxide or two or more different types of peroxide, in which case the amount (in mmol) of —O—O—/kg polymer composition, as defined above, below or in claims, is the sum of the amount of —O—O—/kg polymer composition of each peroxide type. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl) peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned. Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl) peroxide, or mixtures thereof. Most preferably, the peroxide is dicumylperoxide.

Additionally, the polymer composition of the invention may contain, in addition to the polyolefin (a), second polyolefin (b), ion exchanger additive (c) and the optional peroxide, further component(s) such as polymer component(s) and/or additive(s), preferably additive(s), such as any of antioxidant(s), scorch retarder(s) (SR), crosslinking booster(s), stabiliser(s), processing aid(s), flame retardant additive(s), water tree retardant additive(s), further acid or ion scavenger(s), inorganic filler(s) and voltage stabilizer(s), as known in the polymer field. The polymer composition comprises preferably conventionally used additive(s) for W&C applications, such as one or more antioxidant(s) and optionally one or more of scorch retarder(s) or crosslinking booster(s), preferably at least one or more antioxidant(s). The used amounts of additives are conventional and well known to a skilled person.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

The combined amount of polyolefin (a) and the second polyolefin (b) in the polymer composition of the invention is typically of at least 50 wt %, preferably at least 60 wt %, more preferably at least 70 wt %, more preferably at least 75 wt %, more preferably from 80 to 100 wt % and more preferably from 85 to 100 wt %, of the total weight of the polymer component(s) present in the polymer composition. The preferred polymer composition consists of polyolefin (a) and the second polyolefin (b) as the only polymer components. The expression means that the polymer composition does not contain further polymer components, but the polyolefin (a) and the second polyolefin (b) as the sole polymer component(s). However, it is to be understood herein that the polymer composition may comprise further components other than the polyolefin (a), the second polyolefin (b), the ion exchanger additive (c) and the optional and preferable crosslinking agent, such as additives which may optionally be added, as the ion exchanger additive (c), in a mixture with a carrier polymer, i.e. in so called master batch.

The polymer composition, preferably one or both of the polyolefin (a) and the second polyolefin (b), preferably the second polyolefin (b), may optionally be unsaturated (contain carbon-carbon double bonds) before the optional crosslinking, as further described below under the second polyolefin (b).

The invention also provides independently a preferred subgroup of the polymer composition which comprises
(a) a polyolefin which is other than low density polyethylene (LDPE), and which is selected from a polyethylene produced in the presence of an olefin polymerisation catalyst or a polypropylene produced in the presence of an olefin polymerisation catalyst, more preferably a polyethylene produced in the presence of an olefin polymerisation catalyst, more preferably a MDPE polymer or a HDPE polymer, most preferably a HDPE polymer,
(b) a second polyolefin which is different from the polyolefin (a), preferably an LDPE polymer, more preferably an optionally unsaturated LDPE homopolymer or an optionally unsaturated LDPE copolymer of ethylene with one or more comonomer(s), (c) an ion exchanger additive, preferably a hydrotalcite; as defined above, below or in claims, and a peroxide in an amount of less than 37 mmol —O—O—/kg polymer composition, preferably of less than 35 mmol —O—O—/kg polymer composition, preferably of 0.1 to 34 mmol —O—O—/kg polymer composition, preferably of 0.5 to 33 mmol —O—O—/kg polymer composition, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition. This subgroup is preferably crosslinkable and, when crosslinked, provides highly reduced electrical conductivity. The subgroup of polymer composition is novel and the most preferred.

In this subgroup of the polymer composition, the amount of the polyolefin (a) is preferably 50 wt % or less, more preferably of 1.0 to 40 wt %, more preferably of 1.0 to 30 wt %, more preferably of 1.0 to 25 wt %, even more preferably 1.0 to 20 wt %, based on the combined weight of the polyolefin (a) and the second polyolefin (b). Also preferably in this subgroup, the amount of the second polyolefin (b) is 50 wt % or more, more preferably of 60 to 99.0 wt %, more preferably of 70 to 99.0 wt %, more preferably of 75 to 99.0 wt %, even more preferably of 80 to 99.0 wt %, based on the combined weight of the polyolefin (a) and the second polyolefin (b).

This independent subgroup of the polymer composition of the invention is also the most preferred subgroup of the polymer composition of the invention present in at least one layer, preferably at least in the insulation layer, of the power cable of the invention as defined above, below or in claims.

In general, it is preferred that the polymer composition of the invention and the subgroup thereof as defined above, below or in claims are used for producing an insulation layer.

Further preferably, the polymer composition is avoid of, i.e. does not comprise, a carbon black. Also preferably, the polymer composition is avoid of, does not comprise, flame retarding additive(s) in such amounts conventionally used for acting as "flame retardants", e.g. a metal hydroxide containing additives in flame retarding amounts.

The following preferable embodiments, properties and subgroups of the polyolefin (a) and the second polyolefin (b) components, as well as the above preferable embodiments, properties and subgroups of the ion exchanger additive (c) suitable for the polymer composition are independently generalisable so that they can be used in any order or combination to further define the preferable embodiments of the polymer composition and the cable produced using the polymer composition. Moreover, it is evident that the given polyolefin (a) and (b) descriptions apply to the polyolefin prior optional crosslinking.

Polyolefin (a)

Preferably the polyolefin (a) is a low pressure polyethylene, i.e. a polyethylene produced (=polymerised) in the presence of an olefin polymerisation catalyst; or a homo- or copolymer of C3-20 alpha-olefin polymerised in the presence of an olefin polymerisation catalyst, which is then preferably a homo- or copolymers of polypropylene or a homo- or copolymers of butane. Most preferred polyolefin (a) is a polyethylene produced in the presence of an olefin polymerisation catalyst or polypropylene produced in the presence of an olefin polymerisation catalyst and even more preferably a polyethylene produced in the presence of an olefin polymerisation catalyst.

"Olefin polymerisation catalyst" means herein a conventional coordination catalyst. It is preferably selected from a Ziegler-Natta catalyst, single site catalyst which term comprises a metallocene and a non-metallocene catalyst, or a chromium catalyst, or any mixture thereof.

Term "Polyethylene" (PE) means homopolymer of ethylene or a copolymer of ethylene with one or more comonomer(s). "Polypropylene" (PP) means propylene homopolymer, a random copolymer of propylene with one or more comonomer(s) or heterophasic copolymer of propylene with one or more comonomer(s).

Low pressure PE or PP can be unimodal or multimodal with respect to molecular weight distribution (MWD=Mw/Mn). Generally, a polymer comprising at least two polymer fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The term "multimodal" means herein, unless otherwise stated, multimodality at least with respect to molecular weight distribution (MWD=Mw/Mn) and includes also bimodal polymer.

A multimodal low pressure PE or PP usable in the present invention comprises a lower weight average molecular weight (LMW) component (A) and a higher weight average molecular weight (HMW) component (B). Said LMW component has a lower molecular weight than the HMW component.

Naturally, the multimodal low pressure PE or PP may in addition or alternatively to multimodality with respect to MWD be multimodal with respect to density and comonomer content. I.e. the LMW and HMW components may have different comonomer content or density, or both.

Preferably the low pressure PE and PP independently have a MWD of at least 2.0, preferably of at least 2.5, preferably of at least 2.9, preferably from 3 to 30, more preferably from 3.3 to 25, even more preferably from 3.5 to 20, preferably 3.5 to 15. A unimodal PE or PP has typically a MWD of 3.0 to 10.0.

The low pressure PE or PP can be a copolymer of ethylene or, respectively, of propylene (random or heterophasic), with one or more comonomer(s). Comonomer as used herein means monomer units other than ethylene or, respectively propylene, which are copolymerisable with ethylene or, respectively with propylene.

The low pressure PE copolymer is preferably a copolymer of ethylene with one or more olefin comonomer(s), preferably with at least C3-20 alpha olefin, more preferably with at least one C4-12 alpha-olefin, more preferably with at least one C4-8 alpha-olefin, e.g. with 1-butene, 1-hexene or 1-octene. The amount of comonomer(s) present in a PE copolymer is from 0.1 to 15 mol %, typically 0.25 to 10 mol-%.

The PP copolymer is preferably a copolymer of propylene with one or more olefin comonomer(s), preferably with at least one of ethylene or C4-20 alpha olefin, more preferably with at least one of ethylene or C4-12 alpha-olefin, more preferably with at least one of ethylene or C4-8 alpha-olefin, e.g. with ethylene, 1-butene, 1-hexene or 1-octene.

Preferably, the low pressure PE or PP copolymer can be a binary copolymer, i.e. the polymer contains ethylene and one comonomer, or a terpolymer, i.e. the polymer contains ethylene and two or three comonomers.

In the most preferred polymer composition of the invention the polyolefin (a) is a low pressure PE selected from a very low density ethylene copolymer (VLDPE), a linear low density ethylene copolymer (LLDPE), a medium density ethylene copolymer (MDPE) or a high density ethylene homopolymer or copolymer (HDPE). These well known types are named according to their density area. The term VLDPE includes herein PEs which are also known as plastomers and elastomers and covers the density range of from 850 to 909 kg/m$^3$. The LLDPE has a density of from 909 to 930 kg/m$^3$, preferably of from 910 to 929 kg/m$^3$, more preferably of from 915 to 929 kg/m$^3$. The MDPE has a density of from 930 to 945 kg/m$^3$, preferably 931 to 945 kg/m$^3$. The HDPE has a density of more than 945 kg/m$^3$, preferably of more than 946 kg/m$^3$, preferably form 946 to 977 kg/m$^3$, more preferably form 946 to 965 kg/m$^3$.

A unimodal or multimodal MDPE or a unimodal or multimodal HDPE are most preferable types of low pressure PE for use as the polyolefin (a) of the present invention. More preferable polyolefin (a) is a unimodal or multimodal HDPE homopolymer or copolymer, preferably a unimodal or multimodal HDPE homopolymer.

The low pressure PE has preferably an MFR$_2$ of up to 1200 g/10 min, such as of up to 1000 g/10 min, preferably of up to 500 g/10 min, preferably of up to 400 g/10 min, preferably of up to 300 g/10 min, preferably of up to 200 g/10 min, preferably of up to 150 g/10 min, preferably from 0.01 to 100, preferably from 0.01 to 50 g/10 min, preferably from 0.01 to 40.0 g/10 min, preferably of from 0.05 to 30.0 g/10 min, preferably of from 0.1 to 20.0 g/10 min, more preferably of from 0.2 to 15.0 g/10 min.

As mentioned, the preferred polyolefin (a) is a polyethylene produced in the presence of an olefin polymerisation catalyst and selected from an ethylene homopolymer or a copolymer of ethylene with one or more comonomer(s) as defined above or below, including the above and below preferred subgroups thereof.

Suitable low pressure PE and PP, preferably PE, as the polyolefin (a) are as such well known and can be e.g. commercially available or, alternatively, can be produced according to or analogously to conventional polymerisation processes which are well documented in the literature.

The olefin polymerisation catalyst can be selected from well known coordination catalysts, preferably from Ziegler Natta, single site, which term comprises well known metallocene and non-metallocene catalyst, or Chromium catalyst, or any mixtures thereof. It is evident for a skilled person that the catalyst system comprises a co-catalyst. Suitable Ziegler Natta catalysts for low pressure PE are described e.g. in EP0810235 or EP0688794 which are all incorporated by reference herein. Suitable Ziegler Natta catalysts for PP are described e.g. in WO03000754 or EP 1 484 345, which are all incorporated by reference herein. As known PP catalysts typically may contain internal or external donors. As well known the catalytically active catalyst component(s), such as the catalytically active component of the Ziegler Natta catalyst, is normally combined with an activator. Moreover the catalyst system can be non-supported or supported on a carrier, such as external carrier, like silica-based or Mg-based carrier.

The unimodal low pressure PE and PP, preferably PE, can be produced by a single stage polymerisation in a single reactor in a well known and documented manner. The multimodal (e.g. bimodal) low pressure PE or PP, preferably PE, can be produced e.g. by blending mechanically together two or more separate polymer components or, preferably, by in-situ blending during the polymerisation process of the components. Both mechanical and in-situ blending are well known in the field. Accordingly, the preferable in-situ blending means the polymerisation of the polymer components under different polymerisation conditions, e.g. in a multi-stage, i.e. two or more stage, polymerization or by the use of two or more different polymerization catalysts, including multi- or dual site catalysts, in a one stage polymerization, or by use a combination of multistage polymerisation and two or more different polymerisation catalysts. In the multistage polymerisation process the polymer is polymerised in a process comprising at least two polymerisation stages. Each polymerisation stage may be conducted in at least two distinct polymerisation zones in one reactor or in at least two separate reactors. Preferably, the multistage polymerisation process is conducted in at least two cascaded polymerisation zones. Polymerisation zones may be connected in parallel, or preferably the polymerisation zones operate in cascaded mode. The polymerisation zones may operate in bulk, slurry, solution, or gas phase conditions or in any combinations thereof. In the preferred multistage process a first polymerisation step is carried out in at least one slurry, e.g. loop, reactor and the second polymerisation step in one or more gas phase reactors. One preferable multistage process is described in EP517868. For suitable polypropylenes as said polyolefin (a) the preparation processes thereof, reference is also made to e.g. Nello Pasquini (Ed.) Polypropylene Handbook, Hanser, Munich, 2005, pages 15-141.

In general, the temperature in the low pressure PE and PP, preferably PE, polymerisation is typically from 50 to 115° C., preferably from 60 to 110° C. The pressure is from 1 to 150 bar, preferably from 10 to 100 bar. The precise control of polymerisation conditions can be performed using different types of catalyst and using different comonomer and/or hydrogen feeds.

Prepolymerisation may precede the actual polymerisation step(s), as well known in the field.

In case of heterophasic copolymer of propylene the matrix of propylene homopolymer or random copolymer can be produced e.g. in a single stage or as a multistage process described above and the elastomeric (rubber) part of the propylene copolymer can be produced as an in-situ polymerisation e.g. in a separate reactor, e.g. gas phase reactor in the presence of the matrix polymer produced in the previous stage. Alternatively the elastomeric copolymer of propylene part can be mechanically compounded to the matrix phase material, as well known in the art.

The obtained low pressure PE or PP, preferably PE, polymerisation product may be compounded in a known manner and optionally with additive(s) and pelletised for further use.

Second Polyolefin (b)

The second polyolefin (b) can be any polyolefin as defined for polyolefin (a) or a low density polyethylene (LDPE) polymer.

A suitable polyolefin as the second polyolefin (b) can be any polyolefin, such as any conventional polyolefin, which can be used in a cable layer, preferably in an insulating layer, of a cable, preferably of a power cable.

Suitable polyolefins as the second polyolefin (b) are e.g. as such well known and can be e.g. commercially available or can be prepared according to or analogously to known polymerization processes described in the chemical literature.

The preferred second polyolefin (b) is an LDPE polymer which may be a low density homopolymer of ethylene (referred herein as LDPE homopolymer) or a low density copolymer of ethylene with one or more comonomer(s) (referred herein as LDPE copolymer). The one or more comonomers of LDPE copolymer are preferably selected from the polar comonomer(s), non-polar comonomer(s) or from a mixture of the polar comonomer(s) and non-polar comonomer(s), as defined above or below. Moreover, said LDPE homopolymer or LDPE copolymer as said second polyolefin (b) may optionally be unsaturated.

As well known "comonomer" refers to copolymerisable comonomer units.

As a polar comonomer for the LDPE copolymer as said second polyolefin (b), comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of LDPE copolymer is selected from the groups of acrylate(s), methacrylate(s) or acetate(s), or any mixtures thereof. If present in said LDPE copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said second polyolefin (b), comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it preferably comprises 0.001 to 50 wt.-%, more preferably 0.05 to 40 wt.-%, still more preferably less than 35 wt.-%, still more preferably less than 30 wt.-%, more preferably less than 25 wt.-%, of one or more comonomer(s).

The polymer composition, preferably at least the second polyolefin (b) component thereof, more preferably the LDPE polymer, may optionally be unsaturated, i.e. the polymer composition, preferably at least the second polyolefin (b), preferably the LDPE polymer, may comprise carbon-carbon double bonds (—C=C—). The "unsaturated" means herein that the polymer composition, preferably the second polyolefin (b), contains carbon-carbon double bonds/1000 carbon atoms in a total amount of at least 0.4/1000 carbon atoms.

As well known, the unsaturation can be provided to the polymer composition i.a. by means of the polyolefin component(s), a low molecular weight (Mw) compound(s), such as crosslinking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the polymer composition means the sum of the double bonds present in the double-bond sources. It is evident that a characteristic model compound for calibration is used for each chosen source to enable the quantitative infrared (FTIR) determination.

Any double bond measurements are carried out prior to optional crosslinking.

If the polymer composition is unsaturated (prior to optional crosslinking), then it is preferred that the unsaturation originates at least from an unsaturated second polyolefin (b) component. More preferably, the unsaturated second polyolefin (b) is an unsaturated polyethylene, more preferably an unsaturated LDPE polymer, even more preferably an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

In a preferred embodiment the term "total amount of carbon-carbon double bonds" is defined from the unsaturated second polyolefin (b), and refers, if not otherwise specified, to the combined amount of double bonds which originate from vinyl groups, vinylidene groups and trans-vinylene groups, if present. Naturally the second polyolefin (b) does not necessarily contain all the above three types of double bonds. However, any of the three types, when present, is calculated to the "total amount of carbon-carbon double bonds". The amount of each type of double bond is measured as indicated under "Determination methods".

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) which is then preferably selected from acrylate or acetate comonomer(s). More preferably an unsaturated LDPE copolymer is an unsaturated LDPE copolymer of ethylene with at least polyunsaturated comonomer(s).

The polyunsaturated comonomers suitable for the unsaturated second polyolefin (b) preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the carbon-carbon double bonds, preferably to the total amount of the vinyl groups. Herein, when a compound which can also act as comonomer, such as propylene, is used as CTA for providing double bonds, then said copolymerisable comonomer is not calculated to the comonomer content.

If the second polyolefin (b), more preferably the LDPE polymer, is unsaturated, then it has preferably a total amount of carbon-carbon double bonds, which originate from vinyl groups, vinylidene groups and trans-vinylene groups, if present, of more than 0.4/1000 carbon atoms, preferably of more than 0.5/1000 carbon atoms. The upper limit of the amount of carbon-carbon double bonds present in the polyolefin is not limited and may preferably be less than 5.0/1000 carbon atoms, preferably less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is preferably higher than 0.40/1000 carbon atoms, preferably higher than 0.50/1000 carbon atoms, preferably higher than 0.60/1000 carbon atoms.

In a very preferable embodiment the second polyolefin (b) is unsaturated LDPE polymer as defined above and the polymer composition contains the preferable "low" peroxide content of the invention as defined above or in claims. Higher double bond content combined with the preferable "low" peroxide content further contributes to the low electrical conductivity. The embodiment is also preferable e.g. if high cable production speed or longer extrusion time, or both, is desired. The embodiment also contributes to the desirable mechanical and/or heat resistance properties are needed for the layer, preferably insulation layer, material.

More preferably the second polyolefin (b) is unsaturated LDPE as defined above and contains at least vinyl groups and the total amount of vinyl groups is preferably higher than 0.05/1000 carbon atoms, still more preferably higher than 0.08/1000 carbon atoms, and most preferably of higher than 0.11/1000 carbon atoms. Preferably, the total amount of vinyl groups is up to 4.0/1000 carbon atoms. More preferably, the second polyolefin (b), prior to crosslinking, contains vinyl groups in total amount of more than 0.20/1000 carbon atoms, still more preferably of more than 0.30/1000 carbon atoms.

The preferred second polyolefin (b) for use in the polymer composition is an unsaturated LDPE copolymer of ethylene with at least one polyunsaturated comonomer, preferably a diene as defined above, and optionally with other comonomer(s). Further preferably such unsaturated LDPE copolymer of ethylene with at least one polyunsaturated comonomer, preferably a diene as defined above, and optionally with other comonomer(s), contains vinyl groups. In this embodiment the total amount of vinyl groups is preferably as defined above, below or in claims. Said unsaturated LDPE copolymer is highly usable for the invention for use as the second polyolefin (b) of a polymer composition, preferable in an insulation layer of a power cable, preferably of a DC power cable.

Typically, and preferably in wire and cable (W&C) applications, the density of the second polyolefin (b), preferably of the LDPE polymer, is higher than 860 kg/m$^3$. Preferably the density of the second polyolefin (b), preferably of the LDPE homopolymer or copolymer, is not higher than 960 kg/m$^3$, and preferably is from 900 to 945 kg/m$^3$. The MFR$_2$ (2.16 kg, 190° C.) of the second polyolefin (b), preferably of the LDPE polymer, is preferably from 0.01 to 50 g/10 min, more preferably from 0.01 to 40.0 g/10, more preferably is from 0.1 to 20 g/10 min, and most preferably is from 0.2 to 10 g/10 min.

Accordingly, the second polyolefin (b) of the invention is a LDPE polymer, as defined above or in claims, which is preferably produced at high pressure by free radical initiated polymerisation (referred to as high pressure (HP) radical polymerization). The HP reactor can be e.g. a well known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

After the separation the obtained LDPE is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the carbon-carbon double bond content can be adjusted by polymerising the ethylene e.g. in the presence of one or more polyunsaturated comonomer(s), chain transfer agent(s), or both, using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes.

End Uses and End Applications of the Polymer Composition of Invention

The polymer composition of the invention is most preferably used for producing a layer of a cable, preferably of a power cable, more preferably of a direct current (DC) power cable, including the preferable subgroups thereof which can be combined in any order with the preferable subgroups and properties of the polymer composition and the components thereof; as defined above, below or in claims.

The invention further provides a cable, preferably a power cable, more preferably a direct current (DC) power cable, comprising a conductor which is surrounded by at least one layer, which is preferably an insulation layer, wherein said at least one layer comprises, preferably consists of, a polymer composition as defined above, below or in claims comprising
(a) a polyolefin which is other than low density polyethylene (LDPE),
(b) a second polyolefin which is different from the polyolefin (a), and
(c) an ion exchanger additive; as defined above, below or in claims.

The preferred cable of the invention is a power cable, preferably a direct current (DC) power cable, comprising a conductor which is surrounded at least by an inner semiconductive layer, an insulation layer and an outer semiconductive layer, in that order, wherein at least one layer, preferably at least the insulation layer, comprises, preferably consists of, a polymer composition as defined above, below or in claims comprising
(a) a polyolefin which is other than low density polyethylene (LDPE),
(b) a second polyolefin which is different from the polyolefin (a), and
(c) an ion exchanger additive; as defined above, below or in claims.

Accordingly, the inner semiconductive layer of the power cable comprises, preferably consists of, a first semiconductive composition, the insulation layer comprises, preferably consists of, an insulation composition, and the outer semiconductive layer comprises, preferably consists of, a second semiconductive composition. Thus one of the compositions, preferably at least the insulation composition comprises, more preferably, consists of the polymer composition of the invention.

The term "conductor" means herein above and below that the conductor comprises one or more wires. Moreover, the cable may comprise one or more such conductors. Preferably the conductor is an electrical conductor and comprises one or more metal wires.

The first and the second semiconductive compositions can be different or identical and comprise a polymer(s) which is preferably a polyolefin or a mixture of polyolefins and a conductive filler, preferably carbon black. Suitable polyolefin(s) are e.g. polyethylene produced in a low pressure process or a polyethylene produced in a HP process (LDPE). The general polymer description as given above in relation to the polyolefin (a) and, respectively, in relation to the second optional polyolefin (b) apply also for the suitable polymers for semiconductive layers. The carbon black can be any conventional carbon black used in the semiconductive layers of a power cable, preferably in the semiconductive layer of a DC power cable. Preferably the carbon black has one or more of the following properties: a) a primary particle size of at least 5 nm which is defined as the number average particle diameter according ASTM D3849-95a, dispersion procedure D b) iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, preferably furnace carbon black and acetylene carbon black. Preferably, the first and the second semiconductive polymer composition comprises 10 to 50 wt % carbon black, based on the weight of the Semiconductive composition.

The power cable, preferably the DC power cable, of the invention is preferably crosslinkable, wherein at least one layer, preferably at least the insulation layer, comprises, preferably consists of, the polymer composition as defined above, below or in claims comprising
(a) a polyolefin which is other than low density polyethylene (LDPE),
(b) a second polyolefin which is different from the polyolefin (a), and
(c) an ion exchanger additive; as defined above or in claims, and a crosslinking agent, preferably a peroxide in an amount of up to 110 mmol —O—O—/kg polymer composition, preferably of up to 90 mmol —O—O—/kg polymer composition, more preferably of 1.0 to 75 mmol —O—O—/kg polymer composition, preferably of less than 50 mmol —O—O—/kg polymer composition, preferably of less than 40 mmol —O—O—/kg polymer composition, preferably of less than 37 mmol —O—O—/kg polymer composition, preferably of less than 35 mmol —O—O—/kg polymer composition, preferably of 0.1 to 34 mmol —O—O—/kg polymer composition, preferably of 0.5 to 33 mmol —O—O—/kg polymer composition, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition.

Naturally, the further preferable subgroups of the above properties, further properties, variants and embodiments as defined above or below for the polymer composition or for the polyolefin (a), the second polyolefin (b) or the ion exchanger additive (c) and the preferable crosslinking agent components thereof apply similarly to the power cable, preferably to the DC power cable, of the invention.

As well known the cable can optionally comprise further layers, e.g. layers surrounding the insulation layer or, if present, the outer semiconductive layers, such as screen(s), a jacketing layer(s), other protective layer(s) or any combinations thereof.

The invention also provides a process for producing a cable, preferably a power cable, more preferably a DC power cable, as defined above or in claims, which is preferably crosslinkable, whereby the process comprises the steps of
applying on a conductor, preferably by (co)extrusion, at least one layer, preferably an inner semiconductive layer comprising a first semiconductive composition, an insulation layer comprising an insulation composition and an outer semiconductive layer comprising a second semiconductive composition, in that order, wherein the composition of at least one layer, preferably of the insulation layer, comprises, preferably consists of, the polymer composition comprising
(a) a polyolefin which is other than low density polyethylene (LDPE),
(b) a second polyolefin which is different from the polyolefin (a), and
(c) an ion exchanger additive; as defined above or in claims, and optionally, and preferably, a crosslinking agent, which is preferably a peroxide in an amount of up to 110 mmol —O—O—/kg polymer composition, preferably of up to 90 mmol —O—O—/kg polymer composition, more preferably of 0 to 75 mmol —O—O—/kg polymer composition, preferably of less than 50 mmol —O—O—/kg polymer composition, preferably of less than 40 mmol —O—O—/kg polymer composition, preferably of less than 37 mmol —O—O—/kg polymer composition, preferably of less than 35 mmol —O—O—/kg polymer composition, preferably of 0.1 to 34 mmol —O—O—/kg polymer composition, preferably of 0.5 to 33 mmol —O—O—/kg polymer composition, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition. Preferably, the polymer composition comprises the crosslinking agent and the process comprises a further step of crosslinking at least the polymer composition of said insulation layer, in the presence of the crosslinking agent, preferably in an amount as defined above, at crosslinking conditions, and optionally, and preferably, crosslinking at least one, preferably both, of the first semiconductive composition of the inner semiconductive layer and the second semiconductive composition of the outer semiconductive layer, in the presence of a crosslinking agent at crosslinking conditions.

More preferably, a crosslinkable power cable, more preferably a crosslinkable DC power cable, more preferably a crosslinkable HV DC power cable, is produced, wherein the process comprises the steps of (a)
  providing and mixing, preferably meltmixing in an extruder, an optionally, and preferably, crosslinkable first semiconductive composition comprising a polymer, a carbon black and optionally further component(s) for an inner semiconductive layer,
  providing and mixing, preferably meltmixing in an extruder, a crosslinkable polymer composition of the invention comprising, preferably consisting of,
(a) a polyolefin which is other than low density polyethylene (LDPE),
(b) a second polyolefin which is different from the polyolefin (a), and
(c) an ion exchanger additive; as defined above or in claims, and optionally, and preferably, a crosslinking agent, which is preferably a peroxide in an amount of up to 110 mmol —O—O—/kg polymer composition, preferably of up to 90 mmol —O—O—/kg polymer composition, more preferably of 0 to 75 mmol —O—O—/kg polymer composition, preferably of less than 50 mmol —O—O—/kg polymer composition, preferably of less than 40 mmol —O—O—/kg polymer composition, preferably of less than 37 mmol —O—O—/kg polymer composition, preferably of less than 35 mmol —O—O—/kg polymer composition, preferably of 0.1 to 34 mmol —O—O—/kg polymer composition, preferably of 0.5 to 33 mmol —O—O—/kg polymer composition, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition, for an insulation layer,
  providing and mixing, preferably meltmixing in an extruder, an optionally, and preferably, crosslinkable second semiconductive composition comprising a polymer, a carbon black and optionally further component(s) for an outer semiconductive layer, (b) applying on a conductor, preferably by coextrusion,
  a meltmix of the first semiconductive composition obtained from step (a) to form the inner semiconductive layer,
  a meltmix of polymer composition of the invention obtained from step (a) to form the insulation layer, and
  a meltmix of the second semiconductive composition obtained from step (a) to form the outer semiconductive layer, and
(c) optionally crosslinking in the presence of a crosslinking agent and at crosslinking conditions one or more of the polymer composition of the insulation layer, the first semiconductive composition of the inner semiconductive layer and the second semiconductive composition of the outer semiconductive layer, of the obtained cable, preferably at least the polymer composition of the insulation layer, more preferably the polymer composition of the insulation layer, the first semiconductive composition of the inner semiconductive layer and the second semiconductive composition of the outer semiconductive layer.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads.

As well known, the polymer composition of the invention and the optional and preferred first and second semiconductive compositions can be produced before or during the cable production process. Moreover the polymer composition of the invention and the optional and preferred first and second semiconductive composition can each independently comprise part or all of the component(s) of the final composition, before introducing to the (melt)mixing step a) of the cable production process.

Preferably, the polymer composition of the invention and, optionally, the optional first and second semiconductive composition are provided to the cable production process in form of powder, grain or pellets. Pellets mean herein generally any polymer product which is formed from reactor-made polymer (obtained directly from the reactor) by post-reactor modification to a solid polymer particles. A well-known post-reactor modification is pelletising a meltmix of a polymer product and optional additive(s) in a pelletising equipment to solid pellets. Pellets can be of any size and shape. Moreover, the polyolefin components (a) and (b) can be combined in a same powder, grain or pellet product, which thus contains a solid polymer mixture of the polyolefin (a) and the second polyolefin (b). Alternatively and preferably, the polyolefin (a) and the second polyolefin (b) are provided separately, e.g. as two separate pellet products, to the cable production process.

The ion exchanger additive (c) can be present in pellets comprising the both polyolefin components (a) and (b), or in case the separate pellets of each polyolefin component, then in any of the separate pellets. Alternatively, the ion exchanger additive (c) can be added to the polymer components during the cable production process.

All or part of the optional additives can be present in any such powder, grain or pellets or added separately.

Accordingly, the polyolefin (a) and the second polyolefin (b) of the polymer composition can be premixed, e.g.

meltmixed together and pelletised, before providing to the mixing step (a). Alternatively, and preferably, these components can be provided e.g. in separate pellets to the (melt) mixing step (a), where the pellets are blended together. As said above, the ion exchanger additive (c) can be present in any of the separate pellets or added during the (melt)mixing step (a). Preferably the ion exchanger additive (c) is present at least in the polyolefin (a) component, which is preferably a polyethylene produced in the presence of a olefin polymerisation catalyst; as defined above or in claims.

The (melt)mixing step (a) of the provided polymer composition of the invention and of the preferable first and second semiconductive compositions is preferably carried out in a cable extruder. The step a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s). In case one of the polyolefin (a), the second polyolefin (b) and the ion exchanger additive (c), or the optional and preferable peroxide(s) and part or all of the optional further component(s), such as further additive(s), of the polymer composition of the invention and, respectively, part or all of the component(s) of the first or second semiconductive compositions, are added to the polyolefin during the cable production process, then the addition(s) can take place at any stage during the mixing step (a), e.g at the optional separate mixer preceding the cable extruder or at any point(s) of the cable extruder. The addition of the optional peroxide and optional additive(s) can be made simultaneously or separately as such, preferably in liquid form, or in a well known master batch, and at any stage during the mixing step (a).

The polymer composition preferably comprises a crosslinking agent, which is preferably peroxide. The crosslinking agent can be added before the cable production process or during the (melt)mixing step (a). For instance, and preferably, the crosslinking agent and also the optional further component(s), such as additive(s), can already be present in at least one of the polyolefin (a) or the second polyolefin (b) before the use in the production line of the cable production process. The crosslinking agent can be e.g. meltmixed together with the polyolefin (a) or the second polyolefin (b), or both, or a mixture thereof, and optional further component(s), and then the meltmix is pelletised. Alternatively, and preferably, the crosslinking agent is added, preferably impregnated, to the solid polymer particles, preferably pellets, of the polyolefin component(s) or of the polymer composition.

It is preferred that the meltmix of the polymer composition obtained from meltmixing step (a) consists of the polyolefin (a) and the second polyolefin (b) of the invention as the sole polymer components. The ion exchanger additive (c) and the optional, and preferable, additive(s) can be added to polymer composition as such or as a mixture with a carrier polymer, i.e. in a form of so-called master batch.

In a preferred embodiment of the cable production process, a crosslinkable power cable, preferably a crosslinkable DC power cable, more preferably a crosslinkable HV DC power cable, is produced, wherein the insulation layer comprises, preferably consists of, a crosslinkable polymer composition of the invention which further comprises a peroxide in an amount as given above or below, and wherein the second polyolefin (b) is optionally, and preferably, an unsaturated LDPE homo or copolymer, and wherein at least the crosslinkable insulation layer of the obtained cable is crosslinked in step c) at crosslinking conditions.

Accordingly, the invention further provides a crosslinked power cable, preferably a crosslinked DC power cable, more preferably a crosslinked HV DC power cable, wherein at least the layer comprising the polymer composition of the invention, as defined above or in claims, is crosslinked.

Crosslinking of the polymer composition of the insulation layer is preferably carried out in the presence of a peroxide in an amount as defined above or in below claims, and the optional and preferable crosslinking of the first semiconductive composition of the inner semiconductive, is carried out in the presence of crosslinking agent(s), preferably in the presence of free radical generating agent(s), which is preferably a peroxide(s).

The crosslinking agent(s) can already be present in the optional first and second semiconductive composition before introducing to the crosslinking step c) or introduced during the crosslinking step. Peroxide is the preferred crosslinking agent for said optional first and second semiconductive compositions and is preferably included to the pellets of semiconductive composition before the composition is used in the cable production process as described above.

Crosslinking can be carried out at increased temperature which is chosen, as well known, depending on the type of crosslinking agent. For instance temperatures above 150° C., such as from 160 to 350° C., are typical, however without limiting thereto.

The processing temperatures and devices are well known in the art, e.g. conventional mixers and extruders, such as single or twin screw extruders, are suitable for the process of the invention.

The invention further provides a crosslinked power cable, preferably a direct current (DC) power cable, preferably a crosslinked HV DC power cable, where the inner semiconductive layer comprises, preferably consists of, an optionally crosslinked first semiconductive composition, the polymer composition of the insulation layer comprises, preferably consists of, a crosslinked polymer composition of the invention as defined above or in claims, and the outer semicoductive layer comprises, preferably consists of, an optionally crosslinked second semiconductive composition, more preferably where the inner semiconductive layer comprises, preferably consists of, a crosslinked first semiconductive composition, the polymer composition of the insulation layer comprises, preferably consists of, a crosslinked polymer composition according to any of the preceding claims, and the outer semicoductive layer comprises, preferably consists of, an optionally crosslinked, preferably a crosslinked second semiconductive composition.

The preferred DC power cable of the invention is a HV DC power cable. Preferably the HV DC power cable operates at voltages as defined above for HV DC cable or extra HV DC cable, depending on the desired end cable application.

Moreover, the power cable, preferably the DC power cable, more preferably the HV DC power cable, of the invention is crosslinked as described above.

The thickness of the insulation layer of the DC power cable, more preferably of the HV DC power cable, is typically 2 mm or more, preferably at least 3 mm, preferably of at least 5 to 100 mm, more preferably from 5 to 50 mm, and conventionally 5 to 40 mm, e.g. 5 to 35 mm, when measured from a cross section of the insulation layer of the cable. The thickness of the inner and outer semiconductive layers is typically less than that of the insulation layer, and in HV DC power cables can be e.g. more than 0.1 mm, such as from 0.3 up to 20 mm, 0.3 to 10 of inner semiconductive and outer semiconductive layer. The thickness of the inner semiconductive layer is preferably 0.3-5.0 mm, preferably 0.5-3.0 mm, preferably 0.8-2.0 mm. The thickness of the outer semiconductive layer is preferably from 0.3 to 10 mm, such as 0.3 to 5 mm, preferably 0.5 to 3.0 mm, preferably 0.8-3.0 mm. It is evident for and within the skills of a skilled person that the thickness of the layers of the DC cable depends on the intended voltage level of the end application cable and can be chosen accordingly.

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Comonomer Contents a) Comonomer Content in Random Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy. The calibration procedure based on results obtained from quantitative $^{13}$C-NMR spectroscopy was undertaken in the conventional manner well documented in the literature. The amount of comonomer (N) was determined as weight percent (wt %) via:

$$N = k1(A/R) + k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 $cm^{-1}$) or block-like (as in heterophasic PP copolymer) (720 $cm^{-1}$). The absorbance at 4324 $cm^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C, a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in Low Density Polyethylene (1) Polymers Containing >6 Wt. % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylacrylate} - A_{2475}$). Then the maximum absorbance peak for the polyethylene peak at 2660 $cm^{-1}$ was subtracted with the absorbance value for the base line at 2475 cm$^{-1}$ (A$_{2660}$–A$_{2475}$). The ratio between (A$_{methylacrylate}$–A$_{2475}$) and (A$_{2660}$–A$_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York).

Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 Wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ (A$_{polar\ comonomer}$–A$_{1850}$). Then the maximum absorbance peak for polyethylene peak at 2660 cm$^{-1}$ was subtracted with the absorbance value for the base line at 1850 cm$^{-1}$ (A$_{2660}$–A$_{1850}$). The ratio between (A$_{comonomer}$–A$_{1850}$) and (A$_{2660}$–A$_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains 0.20/M$_{butylacrylate}$ (128 g/mol)=1.56×10$^{-3}$ mol. (=1563 micromoles).

The content of polar comonomer units in the polar copolymer C$_{polar\ comonomer}$ is expressed in mmol/g (copolymer). For example, a polar poly(ethylene-co-butylacrylate) polymer which contains 20 wt. % butyl acrylate comonomer units has a C$_{polar\ comonomer}$ of 1.56 mmol/g. The used molecular weights are: M$_{butylacrylate}$=128 g/mole, M$_{ethylacrylate}$=100 g/mole, M$_{methylacrylate}$=86 g/mole).

Density

Low density polyethylene (LDPE): The density was measured according to ISO 1183-2. The sample preparation was executed according to ISO 1872-2 Table 3 Q (compression moulding).

Low pressure process polyethylene: Density of the polymer was measured according to ISO 1183/1872-2B.

Method for Determination of the Amount of Double Bonds in the Polymer Composition or in the Polymer A) Quantification of the Amount of Carbon-Carbon Double Bonds by IR Spectroscopy Quantitative infrared (IR) spectroscopy was used to quantify the amount of carbon-carbon doubles (C═C). Calibration was achieved by prior determination of the molar extinction coefficient of the C═C functional groups in representative low molecular weight model compounds of known structure.

The amount of each of these groups (N) was determined as number of carbon-carbon double bonds per thousand total carbon atoms (C═C/1000C) via:

$$N=(A\times 14)/(E\times L\times D)$$

were A is the maximum absorbance defined as peak height, E the molar extinction coefficient of the group in question (l·mol$^{-1}$·mm$^{-1}$), L the film thickness (mm) and D the density of the material (g·cm$^{-1}$).

The total amount of C═C bonds per thousand total carbon atoms can be calculated through summation of N for the individual C═C containing components.

For polyethylene samples solid-state infrared spectra were recorded using a FTIR spectrometer (Perkin Elmer 2000) on compression moulded thin (0.5-1.0 mm) films at a resolution of 4 cm$^{-1}$ and analysed in absorption mode.

1) Polymer Compositions Comprising Polyethylene Homopolymers and Copolymers, Except Polyethylene Copolymers with >0.4 Wt % Polar Comonomer For polyethylenes three types of C═C containing functional groups were quantified, each with a characteristic absorption and each calibrated to a different model compound resulting in individual extinction coefficients:

vinyl (R—CH═CH2) via 910 cm$^{-1}$ based on 1-decene [dec-1-ene] giving E=13.13 l·mol$^{-1}$·mm$^{-1}$ vinylidene (RR'C═CH2) via 888 cm$^{-1}$ based on 2-methyl-1-heptene [2-methyhept-1-ene] giving E=18.24 l·mol$^{-1}$·mm$^{-1}$ trans-vinylene (R—CH═CH—R') via 965 cm$^{-1}$ based on trans-4-decene [(E)-dec-4-ene] giving E=15.14 l·mol$^{-1}$·mm$^{-1}$ For polyethylene homopolymers or copolymers with <0.4 wt % of polar comonomer linear baseline correction was applied between approximately 980 and 840 cm$^{-1}$.

2) Polymer Compositions Comprising Polyethylene Copolymers with >0.4 wt % Polar Comonomer For polyethylene copolymers with >0.4 wt % of polar comonomer two types of C═C containing functional groups were quantified, each with a characteristic absorption and each calibrated to a different model compound resulting in individual extinction coefficients:

vinyl (R—CH═CH2) via 910 cm$^{-1}$ based on 1-decene [dec-1-ene] giving E=13.13 l·mol$^{-1}$·mm$^{-1}$ vinylidene (RR'C═CH2) via 888 cm$^{-1}$ based on 2-methyl-1-heptene [2-methyl-hept-1-ene] giving E=18.24 l·mol$^{-1}$·mm$^{-1}$

EBA:

For poly(ethylene-co-butylacrylate) (EBA) systems linear baseline correction was applied between approximately 920 and 870 cm$^{-1}$.

EMA:

For poly(ethylene-co-methylacrylate) (EMA) systems linear baseline correction was applied between approximately 930 and 870 cm$^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 cm$^{-1}$.

The molar extinction coefficient (E) was determined as l·mol$^{-1}$·mm$^{-1}$ via:

$$E = A/(C \times L)$$

where A is the maximum absorbance defined as peak height, C the concentration (mol·l$^{-1}$) and L the cell thickness (mm).

At least three 0.18 mol·l$^{-1}$ solutions in carbondisulphide (CS$_2$) were used and the mean value of the molar extinction coefficient determined.

DC Conductivity Method

The plaques are compression moulded from pellets of the test polymer composition. The final plaques consist of the test polymer composition and have a thickness of 1 mm and a diameter of 330 mm.

The conductivity measurement can be performed using a test polymer composition which does not comprise or comprises the optional crosslinking agent. In case of no crosslinking agent the conductivity is measured from a non-crosslinked plaque sample using the below procedure. If the test polymer composition comprises the crosslinking agent, then the crosslinking occurs during the preparation of the plaque samples, whereby the conductivity is then measured according to the below procedure from the resulting crosslinked plaque sample. Crosslinking agent, if present in the polymer composition prior to crosslinking, is preferably a peroxide, as herein.

The plaques are press-moulded at 130° C. for 12 min while the pressure is gradually increased from 2 to 20 MPa. Thereafter the temperature is increased and reaches 180° C. after 5 min. The temperature is then kept constant at 180° C. for 15 min during which the plaque becomes fully crosslinked by means of the peroxide, if present in the test polymer composition. Finally the temperature is decreased using the cooling rate 15° C./min until room temperature is reached when the pressure is released. The plaques are immediately after the pressure release wrapped in metallic foil in order to prevent loss of volatile substances.

A high voltage source is connected to the upper electrode, to apply voltage over the test sample. The resulting current through the sample is measured with an electrometer. The measurement cell is a three electrodes system with brass electrodes. The brass electrodes are equipped with heating pipes connected to a heating circulator, to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in a publication presented at the Nordic Insulation Symposium 2009 (Nord-IS 09), Gothenburg, Sweden, Jun. 15-17, 2009, page 55-58: Olsson et al, "Experimental determination of DC conductivity for XLPE insulation".

Experimental Part

Preparation of the Components of the Polymer Compositions of the Present Invention and of the Reference Composition LDPE1 (polyolefin (b)): The polyolefin was s low density polyethylenes produced in a high pressure reactor. The production of inventive and reference polymers is described below. As to CTA feeds, e.g. the PA content can be given as liter/hour or kg/h and converted to either units using a density of PA of 0.807 kg/liter for the recalculation.

Ethylene with recycled CTA was compressed in a 5-stage precompressor and a 2-stage hyper compressor with intermediate cooling to reach initial reaction pressure of ca 2628 bar. The total compressor throughput was ca 30 tons/hour. In the compressor area approximately 4.9 litres/hour of propion aldehyde (PA, CAS number: 123-38-6) was added together with approximately 81 kg propylene/hour as chain transfer agents to maintain an MFR of 1.89 g/10 min. Here also 1,7-octadiene was added to the reactor in amount of 27 kg/h. The compressed mixture was heated to 157° C. in a preheating section of a front feed two-zone tubular reactor. A mixture of commercially available peroxide radical initiators dissolved in isododecane was injected just after the preheater in an amount sufficient for the exothermal polymerisation reaction to reach peak temperatures of ca 275° C. after which it was cooled to approximately 200° C. The subsequent 2nd peak reaction temperature was 264° C. The reaction mixture was depressurised by a kick valve, cooled and polymer was separated from unreacted gas.

TABLE 1

| Polymer properties of LDPE1 | |
| --- | --- |
| Base Resin Properties | LDPE1 |
| MFR 2.16 kg, at 190° C. [g/10 min] | 1.89 |
| Density [kg/m$^3$] | 923 |
| Vinyl [C=C/1000C] | 0.54 |
| Vinylidene [C=C/1000C] | 0.16 |
| Trans-vinylene [C=C/1000C] | 0.06 |

HDPE (polyolefin (a)): A conventional unimodal high density polyethylene (0.8 mol % 1-butene content, as the comonomer) which is produced in a gas phase reactor. The HDPE has an MFR$_2$ of 12 g/10 min (190° C./2.16 kg) and a density of 962 kg/m$^3$. The same base resin, except that combined with another additive system than specified in table 2, is used in a commercially available grade Bormed HE9621-PH (supplier Borealis).

Ion exchanger additive (c): synthetic hydrotalcite (IUPAC name: dialuminium hexamagnesium carbonate hexadecahydroxide, CAS no. 11097-59-9), supplied by Kisuma Chemicals under the commercial name DHT-4V.

Crosslinking agent: Peroxide: Dicumylperoxide, DCP (CAS no. 80-43-3), commercially available.

Antioxidant (AO): 4,4'-thiobis (2-tertbutyl-5-methylphenol) (CAS no. 96-69-5), commercially available.

Scorch retardant (SR): 2,4-Diphenyl-4-methyl-1-pentene (CAS no. 6362-80-7), commercially available.

Acid scavenger (CaSt): Commerical Calcium stearate CAS no. 1592-23-0, commercially available.

Acid scavenger (ZnSt): Commerical Zink stearate CAS no. 557-05-1, commercially available.

Compounding of the polymer compositions: Each polymer component of a test polymer compositions were added as separate pellets to a pilot scale extruder (Prism TSE 24TC) together with additives, if not present in the pellets, other than the crosslinking agent and SR. The obtained mixture was meltmixed in conditions given in the below table and extruded to pellets in a conventional manner.

| Set Values Temperatures [° C.] | | | | | | Extruder | | | |
| --- | --- | --- | --- | --- | --- | --- | --- | --- | --- |
| Zone 1 | Zone 2 | Zone 3 | Zone 4 | Zone 5 | Zone 6 | rpm | Output [kg/h] | Pressure [bar] | Filter [mesh] |
| 80 | 155 | 165 | 175 | 175 | 180 | 225 | 7.5 | 60 | 325 |

The crosslinking agent, herein peroxide, and SR, if present, were added in liquid form on to the pellets and the resulting pellets were used for the experimental part.

TABLE 2

Polymer compositions of the invention and reference compositions and the electrical conductivity results:

| Recipe name | Ref 1 | Ref 2 | Ref 3 | Ref 5 | Inv. comp |
| --- | --- | --- | --- | --- | --- |
| LDPE* | 100 | 85 | 85 | 85 | 85 |
| HDPE* | | 15 | 15 | 15 | 15 |
| CaSt**, wt % | | | | 0.0112 | |
| ion exchanger additive (c)**, wt % | | | | | 0.0022 |
| AO**, wt % | 0.08 | 0.08 | 0.08 | 0.08 | 0.08 |
| SR**, wt % | 0.05 | 0.05 | 0.05 | 0.05 | 0.05 |
| Crosslinking agent, mmol —O—O—/kg polymer composition (wt % of the final composition**) | 20.5 (0.55) | 28 (0.75) | 28 (0.75) | 28 (0.75) | 28 (0.75) |
| DC conductivity (fS/m) | 23.2 | 3.9 | 3.8 | 20.8 | 0.7 |

*The wt % amounts of polymer components in table are based on the combined amount of the used polymer components. The amount 100 wt % of polymer component in table 1 means that the polymer is the sole polymer component.
**The wt % amounts of ion exchanger additive (c), acid scavenger, peroxide (wt %), AO and SR are based on the final composition.

Preparation of the cable: The polymer composition of the invention was used to produce an insulation layer of a power cable.

Power Cable Extrusion. A cable with three layers was made using a commercial semiconductive composition as inner and outer layer. The middle insulation layer was formed of the polymer composition of the invention. The construction of the cable was 50 mm² stranded Al-conductor and 5.5 mm thick insulation. The inner and outer semiconductive layers had a thickness of 1 mm and 1 mm, respectively. The cable line was a catenary Nokia Maillefer 1+2 system, thus one extrusion head for the inner conducting layer and another for the insulation+outer semiconductive layer.

The non-crosslinked cable was cooled in water.

If the cable was crosslinked, then crosslinking was carried out in the vulcanization tube under nitrogen and afterwards cooled in water.

The obtained cable has a low conductivity and shows the applicability of the polymer composition of the invention as a cable layer, preferably as an insulation layer, in power cable, e.g. of a HV DC power cable applications.

We claim:

1. A cable comprising a conductor surrounded by at least an inner semiconductive layer, an insulation layer and an outer semiconductive layer, in that order, wherein the insulation layer comprises a polymer composition, comprising:
    (a) a polyethylene produced in the presence of an olefin polymerisation catalyst selected from very low density polyethylene (VLDPE) copolymers, linear low density polyethylene (LLDPE) copolymers, medium density polyethylene (MDPE) copolymers or high density polyethylene (HDPE) homopolymers or copolymers;
    (b) a saturated or unsaturated LDPE homopolymer or a saturated or unsaturated LDPE copolymer of ethylene with one or more comonomer(s), and
    (c) an ion exchanger additive;
    wherein said ion exchanger additive is hydrotalcite and is present in an amount of 0.0001 to 0.015 wt % of the polymer composition.

2. The cable according to claim 1, which is a crosslinkable direct current (DC) power cable, wherein said polymer composition of the layer of claim 1 or of the insulation layer of claim 1 further comprises a crosslinking agent.

3. The power cable according to claim 2, which is a crosslinked direct current (DC) power cable, where the inner semiconductive layer comprises an optionally crosslinked first semiconductive composition, the polymer composition of the insulation layer comprises a polymer composition according to claim 2 which is crosslinked in the presence of said crosslinking agent, and the outer semiconductive layer comprises an optionally crosslinked second semiconductive composition.

4. A cable as claimed in claim 1 wherein the cable is a power cable.

5. A cable as claimed in claim 1 wherein the cable is a DC power cable.

6. A cable as claimed in claim 1, wherein for the polyolefin (a) each type of polyethylene can be unimodal or multimodal with respect to molecular weight distribution.

7. A cable as claimed in claim 1, wherein the second polyolefin (b) is an unsaturated LDPE homopolymer or an unsaturated LDPE copolymer of ethylene with one or more comonomer(s) which contains vinyl groups.

8. A cable as claimed in claim 1, wherein the polyolefin (b) is an unsaturated LDPE copolymer of ethylene with at least one polyunsaturated comonomer and optionally with one or more other comonomer(s).

9. A cable as claimed in claim 8, wherein the polyunsaturated comonomer is a C8-14 non-conjugated diene.

10. A cable as claimed in claim 1, wherein the polyolefin (b) contains vinyl groups in total amount of more than 0.20/1000 carbon atoms.

11. A cable as claimed in claim 1, wherein the ion exchanger additive (c) is an inorganic anion exchanger additive.

12. A cable as claimed in claim 1, wherein the ion exchanger additive (c) is an anion exchanger additive of hydrotalcite type.

13. A cable as claimed in claim 1, wherein the polymer composition comprises the ion exchanger additive (c) in an amount of 0.000001 to 0.7 wt %.

14. A cable as claimed in claim 1, wherein the amount of the polyolefin (a) is 1.0 to 40 wt %, based on the combined weight of the polyolefin (a) and the second polyolefin (b).

15. A cable as claimed in claim 1, wherein the amount of the second polyolefin (b) is 60 to 99.0 wt %, based on the combined weight of the polyolefin (a) and the second polyolefin (b).

16. A cable as claimed in claim 1 wherein the polymer composition comprises a peroxide in an amount of up to 100 mmol —O—O—/kg polymer composition.

17. A cable as claimed in claim 1, wherein the polymer composition comprises:
    (a) a MDPE polymer or a HDPE polymer,
    (b) an optionally unsaturated LDPE homopolymer or an optionally unsaturated LDPE copolymer of ethylene with one or more comonomer(s),
    (c) up to 1 wt % ion exchanger additive; and
    a peroxide in an amount of less than 37 mmol —O—O—/kg polymer composition.

* * * * *